6720X
Weed & Fellows.
NO PRINTED SPECIFICATION AVAILABLE
Smut Mill.
Patented Aug. 23, 1831.
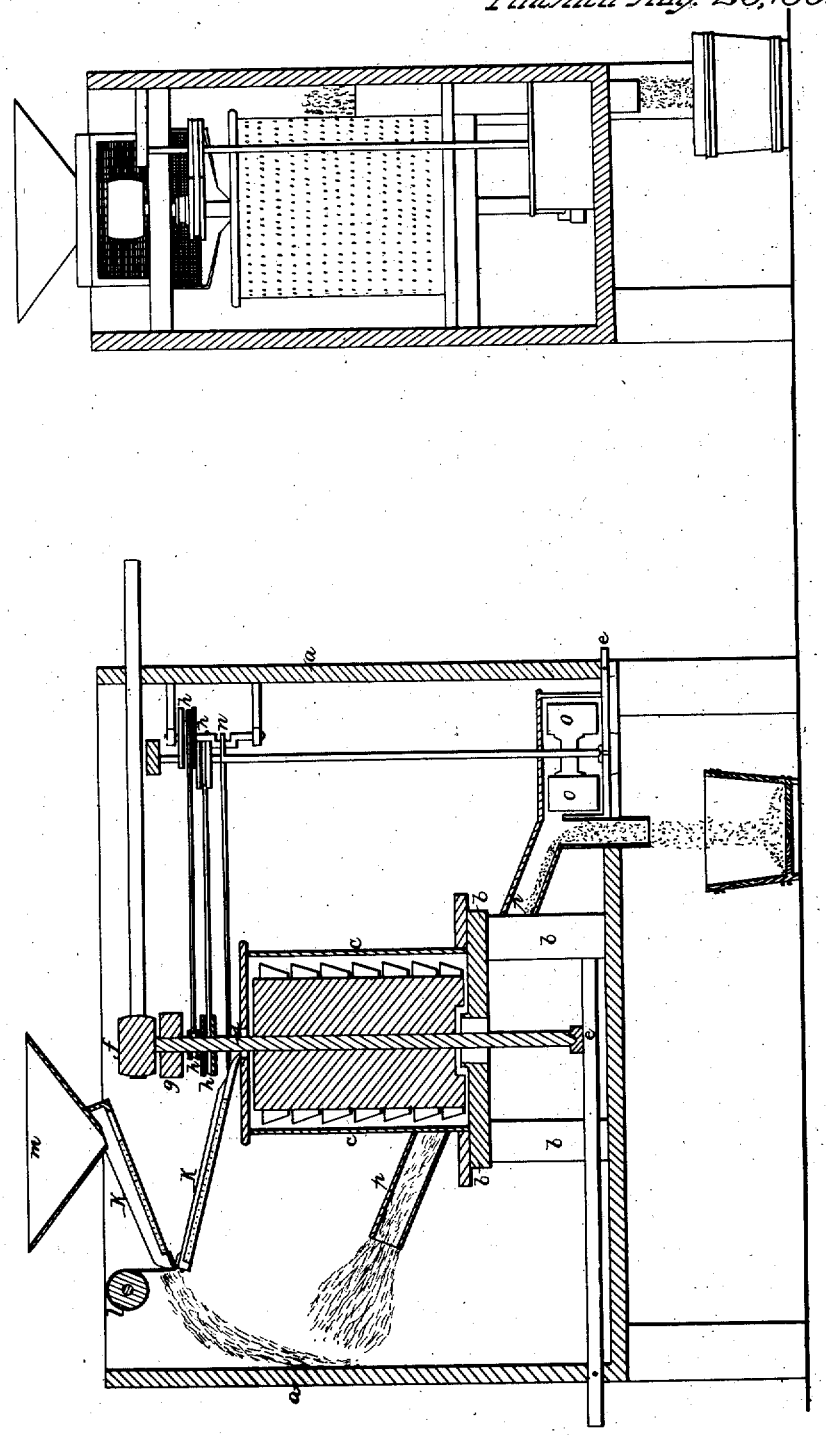

Aug 23 1831 6720X 471

Henry Weed & Stephen Fellows, of Sandwich New Hampshire

Letters Patent.

The schedule referred to in these Letters Patent and making part of the same containing a description in the words of the said Henry Weed, & Stephen Fellows themselves of their improvement in the common smut mill or machine called the Improved portable Smut Machine To all to whom these presents shall come, Be it known that we Henry Weed & Stephen Fellows both of Sandwich in the County of Stafford and State of New Hampshire, have invented a new and useful improvement in the common Smut Mill or machine called the improved Portable smut Machine, for the purpose of cleansing grain before grinding, and that the following is a full and exact description of the construction and operation of the said Machine as invented or improved by us.

First; We form a box or chest of suitable boards or planks, with nails, pegs, or dovetails in the common way; It is four feet in length, one and one half feet in width, with a depth of two feet nine inches, though these proportions may vary and be a little more or somewhat less, to accommodate the wish of the constructor, or to suit the exigencies of the case. The box or chest is supported upon pediments, feet, or legs, about one foot long; Upon one side is a moveable door for the convenience of cleaning out the dust and chaff. The top may be covered when desired 2°, We then fasten with nails or otherwise upon the bottom and near the centre of said chest two blocks of wood about eight inches high and ten inches apart; we fasten upon the top of these blocks a board some larger than the diameter of the curve and cover the top of this board with sheet iron or some other suitable metallic substance we have a round opening in the centre of the above named board and iron about three inches in diameter, to receive the spindle of a cylinder, and to admit air into the curve, around this opening is raised a ridge or eminence to prevent the grain from wasting 3°. We then make a circular curve of sheet iron or other suitable metal tin—

[illegible]

6720X substance about fourteen inches high, and twelve inches in diameter punche[d]
full of holes either square oblong or round from the circumference towards
centre, so as to form sharp points or eminences upon the inside thereof, bo[th]
ends of which curve may be of a size, or the lower end may be the large[r].
This curve is made to shut down upon the cover of the blocks aforesaid
& to preserve the ends round and keep them steady by means of a plank [illegible]
out circular to conform thereto, and extend to the sides of the chest. A cap
cover is made to said curve in two pieces with a hole through the centr[e]
sufficiently large for the spindle of a cylinder & to receive the grain
from a seive, and an opening is also made in one edge of the curve at t[he]
bottom for the grain to pass out, 4th. We then form a cylinder of solid wood or otherwise to be placed wi-
-in and conform to the curve as hereinafter described the lower end of
which cylinder is formed hollow with a rim on the edge for the purp[ose]
of shutting down around the ridge or eminence above described. The circ[um]
ference of this cylinder, we then cover with tin, sheet iron, or other suita[ble]
metallic, smooth or made rough like a grater, or in some cases it may [be]
without said covering. the cylinder is armed or roughned with metallic
beads, metallic stumps or other hard eminences about two inches lon[g]
and one inch wide at one end and about one half inch wide, at the o[ther]
end somewhat resembling the letter V, We then mark straight parallel lin[es]
around the cylinder an inch apart, commencing within one half inch from the
bottom, and insert the said metallic beads. stumps or eminences into the
same either at right angles thereto or slanting upon said marked lines
thus, ( / ) for the purpose of longer retaining the grain in the curve, so
that said beads &c. when placed would form diagonal lines, and proje[ct]
out upon the cylinder, three fourths of an inch. Or that part of the sa[id]
beads, stumps, or eminences, which project from the cylinder and whic[h]
strikes the grain, may be made rough somewhat like a rasp, several
nails driven in a cluster may answer as a substitute for the beads, stum[ps]
or eminences. Or in another way we cover the cylinder with sheet iron or [illegible]
suitable metallic substance cut into oblong strips about one inch wide, an[d]
three and one half inches long with the ends square or diamonding as we shape. About three quarters of an inch of one end, is bent outwards on a line parallel with the other end, forming an eminence and resembles the letter L or the longest end is then confined upon the cylinder, so that when placed those [illegible] which are bent outwards range the same as the stump or eminences before described and may be roughened by punching if necessary.

5th. We then make an iron shaft or spindle about two feet six inches long and one inch in diameter, which passes through the centre of said cylinder, and extends out through the bottom about eight inches resting on a metallic step or box placed in a bridgetree near the bottom of said chest which bridgetree passes through one side of the chest and is used for the purpose of regulating the cylinder, the upper part of the shaft or spindle, is made to revolve in a block of wood called a "plummer block" extending across the chest near the top. Upon that part of the spindle which extends above the plummer block, we affix a whirl or drum for the purpose of carrying said machine with a band or belt, which whirl, or drum, is four inches in diameter, and two and one half inches thick, or of such a size as the speed requires. Upon said spindle we affix one whirl, about two inches in diameter and one inch thick, and another immediately below and adjoining thereto, four inches in diameter, and one inch thick, both of which last mentioned whirls are between the said plummer blocks and cylinder close to the block.

This shaft together with the cylinder when completed must be placed perpendicularly in the centre of the curve leaving about one third of an inch's space between the eminences of the cylinder and those of the curve 6th. We have two small seives one over the other fastened together and hung in such a manner that the upper or coarse one descends from the curve with the lower end open, the other descends toward the curve. The upper one receives the grain from a hopper of common form, and retains the [illegible] which pass off into the chest, and permits the grain to fall upon the second. The foul seeds pass through the second seive into the chest and the grain is conducted through the cap or covering of the curve. —

The end of the seive frame remotest from the curve is hung with a strap or line fixed to a roller for the purpose of regulating the feed, the other end rests upon the cap or cover of the curve. These seives are shaken by a [illegible] also — also

6709X attached to a small crank near the end of the chest opposite to the seive
the arm of which crank is about one third of an inch long. Around the
of this crank is a whirr four inches in diameter which receives and is car
ried by a band from a whirr on the said cylinder shaft two inches i
diameter. ——

7th. We form a spout about three feet long which stands somewhat di
agonally with the lower end placed so as to receive the wind from a f
with the under part shortest, to let the grain fall through the bottom o
the chest or it may be conducted out at the side. The spout then passes
up by the lower part of the curve, with a hole in one side opposite the op
-ing in the curve for the purpose of receiving the grain, it then continues
about two feet through which the chaff is blown into the chest. ...

8th. We also make a curve for a fan about eight inches in diamete
and four inches deep and place it perpendicularly upon the botton
of the chest at the end opposite the seive, near the corner, through th
bottom of the chest, in the centre of this curve is made a circular hole t
inches in diameter to admit air into the curve, In this curve upon t
edge near the top is made an opening corresponding with the spout
Also we have a fan as large as will operate in this curve made
wood or sheet iron attached to a wooden or iron shaft, which stands p
allel with the spindle of the cylinder, and has a whirr near the uppe
about four inches in diameter, and one inch thick to receive a belt th
passes around a whirr on the spindle of the cylinder of the same si This shaft or spindle, rests upon a bridgetree affixed to the bot
of the chest and revolves therein and at the top it is fastened simil
to that of the cylinder, The curve of the fan, is covered with a board m
in two pieces —— What we consider new in said machine
for which we ask an exclusive privilege is, Firstly placing the mach
in a chest, secondly the shape of the beads &c. Thirdly in making the
rough, Fourthly the manner of placing them in the cylinder, Fifthly
the driving of the nails in clusters, Sixthly the cutting of the sheet ir
&c into strips and making them rough like a rasp or grater.

Advantages. What we consider as advantages which this mach

6720X possess above the common smut Machine, are the following.

Firstly – The saving of expense – Secondly, it takes less power to operate the same – Thirdly, in having the dust retained in the chest, Fourthly it is smaller and more portable, Fifthly, it may be put in operation with a belt by almost any other machinery with very little expense.

Sandwich April 26th A.D. 1831. –

Witness
N. G. Norris
Aaron B. Hoyt

Henry Weed
Stephen Fellows 1890 nor

E.?
Ch.W.